United States Patent [19]

Supcoe et al.

[11] 4,354,873

[45] Oct. 19, 1982

[54] UNDERWATER ANTIFOULANT COMPOSITION

[75] Inventors: Robert F. Supcoe, Annapolis, Md.; Thomas Radakovich, Arlington, Va.

[73] Assignee: The United States of America as represented by the Secretary of the Navy, Washington, D.C.

[21] Appl. No.: 264,904

[22] Filed: May 18, 1981

[51] Int. Cl.³ .................... C09D 5/08; C09D 5/14
[52] U.S. Cl. .................... 106/18.32; 106/18.35; 106/287.13; 106/287.14; 424/141; 424/288
[58] Field of Search .............. 106/287.13, 287.14, 106/18.12, 18.32, 18.35; 424/288, 141

[56] References Cited

U.S. PATENT DOCUMENTS

| | | | |
|---|---|---|---|
| 3,959,530 | 5/1976 | Kaliardos | 106/4 |
| 4,020,200 | 4/1977 | Groszek et al. | 427/416 |
| 4,025,693 | 5/1977 | Milne | 428/447 |
| 4,098,925 | 7/1978 | Rasmussen | 427/154 |
| 4,115,130 | 9/1978 | Crump et al. | 106/16 |
| 4,154,818 | 5/1979 | Kanada et al. | 424/81 |
| 4,186,026 | 1/1980 | Rotenberg et al. | 106/287.14 |
| 4,227,929 | 10/1980 | Law et al. | 106/15.05 |
| 4,293,339 | 10/1981 | Supcoe et al. | 106/18.29 |

*Primary Examiner*—Lorenzo B. Hayes
*Attorney, Agent, or Firm*—R. F. Beers; L. A. Marsh; W. W. Randolph

[57] ABSTRACT

An antifouling coating for application to submerged surfaces comprises, by weight percent, from about 3-5% fumed silica, from about 60-70% silicone oil, from about 20-30% antifoulant, and from about 0.5-2.0% surfactant.

2 Claims, No Drawings

UNDERWATER ANTIFOULANT COMPOSITION

This invention generally relates to coating materials and more particularly to an improved antifouling formulation suitable for application to the submerged surfaces of ships and capable of being applied underwater.

Although various antifouling paints and related compositions have been developed to prevent marine organisms from fouling the bottoms of ships while at sea, a greater degree of marine growth and fouling of ship bottoms is often experienced while the ships are in port. Accordingly, temporary antifouling formulations, such as wax and silicone based coating materials, have been developed to provide additional protection while the ships are in port. Prior wax-based formulations are set forth in U.S. Pat. No. 4,293,339 dated Oct. 6, 1981 granted to Robert F. Supcoe et. al., the teachings of which are herein incorporated by reference, and further exemplified by U.S. Pat. Nos. 2,838,419; 3,806,352; 3,959,530; 4,020,200; 4,098,925; 4,115,130; and 4,154,818. Silicone-based formulations are set forth in U.S. Pat. Nos. 4,025,693; 4,080,190; 4,227,929; and 4,186,026. However, many antifouling formulations of the abovementioned kind have the common drawback of being difficult to apply underwater to submerged surfaces.

SUMMARY OF THE INVENTION

The present invention overcomes application problems experienced with the prior art by providing a durable silicone-based antifouling formulation capable of being applied to the submerged surfaces of ships wherein the seawater temperature may range from about 45° F. to about 80° F. Since physical properties of the antifouling formulation, such as hardness, viscosity, and plasticity, are affected by the temperature of the seawater, it is critical that the formulation is easy to apply at a variety of temperatures. The antifouling formulation should also be capable of displacing water molecules from the ship surface yet remain insoluble in seawater and sufficiently hard to provide a durable coating. Another coating requirement satisfied by the present antifouling formulation is that it provides good adhesion and affinity with a ship surface while precluding the attachment of various marine organisms thereto. A further requirement for the silicone-based antifouling formulation is that the formulation is capable of accepting specific types of antifoulants and biocides without adversely reacting therewith. The abovementioned criteria are met by providing an antifouling formulation comprising, by weight percent, from about 3-5% fumed silica; from about 60-70% silicone oil; from about 20-30% antifoulant; and from about 0.5-2.0% surfactant.

Thus, one object of the present invention is to provide a means for coating an underwater surface with a silicone-based formulation containing a biocidal composition effective against weed and/or shell growth.

Another object of this invention is the provision of a durable protective coating for ship bottoms which exhibits good spreadability and easy application throughout a broad range of temperature conditions.

A further object of the present invention is to provide a thixotropic antifouling coating for underwater application to prevent corrosion and marine growth on ship surfaces.

DETAILED DESCRIPTION OF THE INVENTION

The antifouling composition of the present invention comprises about 2-10% and preferably about 3-5% of a thixotropic thickening agent in the form of fumed silica; about 50-80% and preferably about 60-70% of a silicone oil in the form of dimethyl-polysiloxanes; about 20-45% of a compatible antifoulant; and from about 0.2-4.0% and preferably about 0.5-2.0% of a suitable surfactant.

Fumed silica or silicon dioxide is primarily used as a thixotropic thickening agent to modify the flow characteristics of the composition. Fumed silica is conventionally produced by the hydrolysis of silicon tetrachloride vapor in the presence of a combustion flame of hydrogen and oxygen gases.

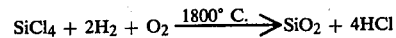

$$SiCl_4 + 2H_2 + O_2 \xrightarrow{1800°\ C.} SiO_2 + 4HCl$$

The same droplets of silicon dioxide ($SiO_2$) (eg. about 7-14 millimicrons in diameter) collide and fuse together to form branched, chain-like aggregates. As the fused aggregates cool below the fusion temperature, the silicon dioxide aggregates fuse together and become physically entangled to form agglomerates. During formation of the fumed silica particles, chemical groups become attached to some of the silicon atoms on the surface of the particles. These chemical groups include hydrophilic hydroxyl groups (—OH); hydrophilic hydrogen bonded hydroxyl groups (—$OH_2$—); and nonpolar siloxane groups (—O—).

The hydroxyl groups (—OH) attached to the surface silicon atoms are used to form hydrogen bonds between different aggregate particles and other hydrogen bonding substances such as alcohols, carbonyl compounds, ethers, etc. The hydrogen bonding characteristics provided by the hydroxyl groups provides a means for thixotropically thickening liquid suspensions by linking the aggregates together through hydrogen bonding. A thixotropic material, such as fumed silica, exhibits a decrease in viscosity as a shear stress is applied to the material and a subsequent viscosity increase when the shear force is eliminated. Factors affecting the efficiency of fumed silica as a thickening agent include the nature of the solution with which it is combined; the fumed silica concentration; the pH of the solution; and the presence of additives.

In non-hydrogen bonding and low hydrogen bonding systems fumed silica exhibits it greatest degree of hydrogen bonding with other fumed silica aggregates thereby producing the greatest degree of thickening and thixotropy. In these solutions the hydroxyl groups attached to the surface silica atoms have no competition from other substances to reduce their hydrogen bonding attraction for each other. Thus, the fumed silica aggregates orient themselves in the suspension to form a three-dimensional matrix of fumed silica aggregates. As a shear force is applied to the matrix, the aggregates are disrupted and the viscosity of the solution decreases. Upon removal of the shear force, the aggregates form hydrogen bonds to re-establish a matrix and the viscosity approaches its original value.

In high hydrogen bonding systems the capability of fumed silica aggregates to form hydrogen bonds with each other is lower than for the low hydrogen bonding systems since there is competition from other liquid molecules for attachment to the fumed silica hydroxyls. Generally, the viscosity of these fluid systems can be increased by increasing the concentration of the fumed silica.

Additives for fumed silica are herein defined as substances whose presence in comparatively small amounts produces a large effect on the flow characteristics of the system. In high hydrogen bonding liquids cationic surfactants are most useful in improving the thickening and thixotropic efficiency of fumed silica. The cationic surfactants modify and partially impede the interaction between the fumed silica hydroxyls and the solvent molecules, thereby allowing the fumed silica matrix structure to develop more completely. In medium to low hydrogen bonding systems, anionic surfactants and additives having short chain molecules with poly-functional groups attached thereto act as bridging compounds between some of the surface hydroxyls of adjacent fumed silica aggregates, thereby forming chains consisting of alternating silica aggregates and other molecular constituents.

Properties of suitable fumed silica produced under the trade name Cab-O-Sil by Cabot Corporation, Boston, Mass. are set forth in the following table.

lant. The basic structure of the polydimethysiloxanes is indicated as follows;

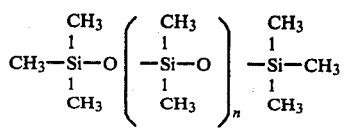

where "n" represents the number of intermediate siloxane groups. The —Si—O—Si—O— backbone is arranged in a zigzag fashion with rotation freely occurring about both the SiO and SiC axes. Because the intermolecular forces are weak, the polymers exhibit low melting and boiling points, low surface tension, high compressibility, shear stability, and small changes in viscosity with temperature changes. Dimethylpolysiloxane fluids are also good hydrodynamic lubricants and, when spread on a surface, are water repellant. The dimethylpolysiloxanes are soluble or emulsifiable with many organic materials and they exhibit medium to low hydrogen bonding tendencies.

The molecular weight of the dimethylpolysiloxanes

| | Surface Area (m²/gm) | | | | | Density (lbs/ft³) | | pH (4% in H₂O) | | |
|---|---|---|---|---|---|---|---|---|---|---|
| Grade | 200 = 25 | 255 ± 15 | 325 ± 25 | 390 ± 40 | 400 ± 20 | 2.3 max. | 4.5 ± 0.5 | 3.5–4.2 | 3.6–4.2 | 3.6–4.0 |
| M-5 | X | | | | | X | | X | | |
| MS-7 | X | | | | | | X | | X | |
| MS-75 | | X | | | | | X | | X | |
| HS-5 | | | X | | | X | | | X | |
| EH-5 | | | | X | | X | | X | | |
| S-17 | | | | | X | | X | | | X |
| All grades: Residue on 325 Mesh = 0.02% max. | | | | | | | | | | |

| | Nominal Particle Size (Diameter in Microns) | | | | Ignition Loss (1000° C. moisture-free basis) | | | |
|---|---|---|---|---|---|---|---|---|
| Grade | 0.014 | 0.011 | 0.008 | 0.007 | 1.0% | 1.5% | 2.0% | 2.5% |
| M-5 | X | | | | X | | | |
| MS-7 | X | | | | X | | | |
| MS-75 | | X | | | | X | | |
| HS-5 | | | X | | | X | | |
| EH-5 | | | | X | | | | X |
| S-17 | | | | X | | | | X |
| All grades: Bulking Value = 5.5 gal./100 lbs. | | | | | | | | |
| Specific Gravity = 2.2 | | | | | | | | |
| Color = White | | | | | | | | |
| Silica Content (ignited Sample) = >99.8% | | | | | | | | |
| Refractive Index = 1.46 | | | | | | | | |
| X-ray Form = Amorphous | | | | | | | | |

Silicone fluids in the form of dimethylpolysiloxanes are utilized as a gelled carrier vehicle for the antifoulant. affects the viscosity of the fluid and they are produced commercially with viscosities that range from about 7 to about 100,000 centistokes. For example, suitable dimethylpolysiloxanes produced by Union Carbide under the name "L-45 Silicone Fluids" are set forth below.

| L-45 Silicone Fluids | Viscosity at 25° C. Centistokes | Apparent Specific Gravity at 25/25° C. | Pour Point, °F. | Coefficient of Expansion | Thermal Conductivity | Viscosity Temperature Coefficient | Flash Point °F. |
|---|---|---|---|---|---|---|---|
| Low-Viscosity | 5 | 0.917 | −85 | 11.2 | — | — | >250 |
| | 7 | 0.930 | −160 | 11.1 | 0.074 | 0.54 | >275 |
| | 10 | 0.935 | −85 | 10.8 | 0.074 | 0.57 | 325 |
| | 20 | 0.950 | −76 | 10.7 | 0.079 | 0.59 | 400 |
| Intermediate-Viscosity | 50 | 0.960 | −67 | 10.4 | 0.084 | 0.59 | 535 |
| | 100 | 0.966 | −67 | 9.7 | 0.086 | 0.60 | 575 |
| | 200 | 0.968 | −63 | 9.7 | 0.087 | 0.62 | >575 |
| | 350 | 0.969 | −58 | 9.7 | 0.088 | 0.62 | >575 |
| | 500 | 0.971 | −58 | 9.7 | 0.088 | 0.62 | >575 |
| | 1000 | 0.971 | −58 | 9.7 | 0.088 | 0.62 | >575 |
| High-Viscosity | 10,000 | 0.974 | −53 | 9.7 | 0.088 | 0.61 | >575 |
| | 12,500 | 0.974 | −51 | 9.7 | 0.088 | 0.61 | >575 |
| | 30,000 | 0.976 | −47 | 9.7 | 0.088 | 0.61 | >575 |
| | 60,000 | 0.976 | −46 | 9.7 | 0.088 | 0.61 | >575 |

| L-45 Silicone Fluids | Viscosity at 25° C. Centistokes | Apparent Specific Gravity at 25/25° C. | Pour Point, °F. | Coefficient of Expansion | Thermal Conductivity | Viscosity Temperature Coefficient | Flash Point °F. |
|---|---|---|---|---|---|---|---|
| | 100,000 | 0.976 | −45 | 9.7 | 0.088 | 0.61 | >575 |
| | 500,000 | 0.978 | −45 | 9.7 | 0.088 | 0.61 | >575 |

Characteristics of compatible dimethylpolysiloxanes manufactured by Petrach Systems Inc., Levittown, Pa. are listed in the following table.

| | | polyDIMETHYLSILOXANES | | | |
|---|---|---|---|---|---|
| CODE | VISCOSITY | MOLECULAR WEIGHT | SPECIFIC GRAVITY | REFRACTIVE INDEX | SURFACE TENSION |
| PS035 | 1.0 | 237 | 0.818 | 1.3825 | 17.4 |
| PS036 | 1.5 | 340 | 0.853 | 1.3880 | 18.0 |
| PS037 | 2.0 | 410 | 0.873 | 1.3900 | 18.7 |
| PS038 | 5.0 | 770 | 0.920 | 1.3970 | 19.7 |
| PS039 | 10 | 1200 | 0.934 | 1.3990 | 20.1 |
| PS040 | 50 | 3900 | 0.960 | 1.4015 | 20.8 |
| PS041 | 100 | 5200 | 0.960 | 1.4025 | 20.9 |
| PS042 | 500 | 10,400 | 0.971 | 1.4033 | 21.1 |
| PS043 | 1000 | 11,400 | 0.971 | 1.4033 | 21.1 |
| PS044 | 5000 | 24,000 | 0.972 | 1.4035 | 21.1 |
| PS045 | 10000 | 36,000 | 0.975 | 1.4035 | 21.3 |
| PS046 | 12500 | 40,400 | 0.975 | 1.4035 | 21.3 |
| PS047 | 30000 | 51,000 | 0.975 | 1.4035 | 21.3 |
| PS048 | 100000 | 75,000 | 0.976 | 1.4035 | 21.3 |
| PS049 | 600,000–1,400,000 | 105,000 | 0.980 | 1.4035 | 21.3 |
| dielectric strength | 35 KV | | | | |
| dissipation factor $10^2$–$10^6$ cycles | 0.0001 | | | | |
| dielectric constant $10^2$–$10^6$ cycles | 2.60–2.75 | | | | |
| volume resistivity | $1 \times 10^{19}$ | | | | |
| specific heat | 0.36 BTU/lb/°F. | | | | |
| thermal conductivity | 0.067–0.090 BTU/hr °F. | | | | |

Since the dimethylpolysiloxanes exhibit medium to low hydrogen bonding capacity, the fumed silica, when added thereto, forms a highly efficient and durable thixotropic means for thickening the antifouling composition. The use of compatible surfactants of the following types has been found to synergistically improve not only the thickening and thixotropic properties of the composition but also the underwater application of the composition: anionic surfactants, nonionic surfactants with medium to high hydrophilic-lipophilic balances, specific polyfunctional group additives (ie. especially those with short chain molecules), and amphoteric surfactants.

Anionic surfactants improve the gelling or thickening action of the dimethylpolysiloxane-fumed silica mixture; they promote displacement of water molecules from the substrate; and they improve adhesion of the antifouling composition to the submerged ship surface. Sarkosyl surfactants, such as made by CIBA-GEIGY, find particular application in the present formulation. They are made by reacting sarcosine, a N-methyl derivative of glycine ($NH_2CH_2COOH$, an amino acid), with fatty acid chlorides to yield a polar molecule in which the C—N—C amide linkage is interposed between the hydrophobic hydrocarbon chain and the hydrophilic carboxy group. This interposition of the amide bond is a characteristic of the Sarkosyl family and makes them very stable to acids and alkalies. They also improve the water hardness of the mixture, preclude stratification and/or separation of the constituents, and are stable against metallic salts. A particular example of a Sarkosyl surfactant is Sarkosyl O made by CIBA GEIGY and having the general formula $CH_3(CH_2)_{17}$—CON($CH_3$)$CH_2COOH$. In N-acyl sarcosine the hydrocarbon chain is interrupted by an amido ethyl group (—CONC-$H_3$—). The nitrogen group added to the double bond in the organic acid chain improves water displacement of the coating composition and improves adhesion properties. Other anionic surfactants include carboxylate, sulfonate, sulfate and/or phosphate groups.

Another example of a compatible surfactant is Armeen-Z-Armour, RNHCH $CH_3CH_2$ COOH. This is an amphoteric surfactant which is a product of a primary coco amine and crotonic acid. Another anionic surfactant is sodium lauryl sulfate $C_{12}H_{25}Na\ O_4S$, which is prepared by sulfation of lauryl alchohol followed by neutralization with sodium carbonate. Generally, amphoteric surfactants contain both an acidic and a basic hydrophilic moiety in their structure. These ionic functions may be almost any of the characteristic anionic or cationic groups and the surfactant molecule may contain several ionic functions. Many compatible amphoteric surfactants also contain hydroxyls that strengthen their hydrophilic tendency.

A wide variety of biocides, as for example disclosed in U.S. Pat. No. 4,020,200, are compatible with the abovementioned constituents. Biocidal compounds which can be added to the mixture and are effective against marine growth include metal based compounds; such as those containing tin, copper, zinc, nickel, cobalt, manganese, and/or mercury; and organic compounds having an active structure containing sulfur, chlorine, nitrogen and oxygen atoms. Among the most effective biocidal compounds for preventing marine growth on underwater surfaces are copper compounds, such as cuprous oxide, and the organo-tin compounds. One example of an antifoulant is Nopcocide N-96 made by Diamond Shamrock and having an empirical formula $C_8Cl_4N_2$. It has a benzene structure with a molecular weight of 265 and has a chemical name of 2,4,5,6-Tetrachloroisophthalonitrile. Nopcocide N-96 has a melting point of 250° C., a boiling point of about 350° C., and a specific gravity of 1.8.

Other specific antifoulants include A0525B Organotinpolysiloxane, Copper Oxide, and Copper 2-Ethyl Hexoate.

An example of a specific antifouling formulation is given below, in weight percent.

| | |
|---|---|
| Dow Corning Fluid DC 200 | 66% |
| Cab-O-Sil M5(fumed silica) | 5% |
| Nopcocide N-96 | 27% |
| Sodium Lauryl Sulfate | 2% |

The antifouling formulation is normally prepared by charging the silicone fluid into a mixing tank and adjusting the mixing speed to form a deep vortex. The fumed silica is then added to the center of the vortex to promote uniform dispersion of the fumed silica particles. Thereafter, the surfactant and the antifoulant are successively added to the mixing tank. The final viscosity of the antifouling formulation is on the order of about 35,000 cps.

Obviously many modifications and variations of this invention are possible in light of the above teachings. It is therefore to be understood that within the scope of the following claims the invention may be practiced otherwise than as specifically described.

What is claimed is:

1. An antifouling material having a viscosity of between about 25,000 and 45,000 cps. at 25° C. for application to submerged surfaces consisting essentially of, by weight percent, of
   from about 2% to about 10% of fumed silica thixotropic thickening agent;
   from about 50% to about 80% dimethylpolysiloxane having a molecular weight between about 1,200 and 12,000 and a viscosity between about 10 and 1,000 centistokes at 25° C.;
   from about 20% to about 45% of antifoulant selected from the group of 2, 4, 5, 6-tetrachloroisophthalonitrile, copper oxides and copper 2-ethyl hexoate
   from about 0.2% to about 4.0% of a surfactant for improving the displacement of the water molecules from the submerged surface, wherein the surfactant is selected from the group of anionic and amphoteric surfactants.

2. A method of coating submerged surfaces for preventing marine growth comprises the step of applying an antifouling material directly to the submerged surfaces, said antifouling material having a viscosity of between about 25,000 and 45,000 cps. at 25° C. and consisting essentially of:
   from about 2% to about 10% of fumed silica thixotropic thickening agent:
   from about 50% to about 80% dimethylpolysiloxane having a molecular weight between about 1,200 and 12,000 and a viscosity between about 10 and 1,000 centistokes at 25° C.;
   from about 20% to about 45% of antifoulant selected from the group of 2, 4, 5, 6-tetrachloroisophthalonitrile, copper oxides and copper 2-ethyl hexoate
   from about 0.2% to about 4.0% of a surfactant for improving the displacement of the water molecules from the submerged surface, wherein the surfactant is selected from the group of anionic and amphoteric surfactants.

* * * * *